(12) United States Patent
Peng et al.

(10) Patent No.: US 10,250,146 B2
(45) Date of Patent: Apr. 2, 2019

(54) SOFT-START POWER SUPPLY CIRCUIT, METHOD FOR CONTROLLING THE SAME, AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Xiaofei Peng, Beijing (CN); Jiacheng Huang, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/682,230

(22) Filed: Aug. 21, 2017

(65) Prior Publication Data
US 2018/0109194 A1 Apr. 19, 2018

(30) Foreign Application Priority Data
Oct. 14, 2016 (CN) .......................... 2016 1 0900365

(51) Int. Cl.
*H02M 3/158* (2006.01)
*H02M 3/335* (2006.01)
(Continued)

(52) U.S. Cl.
CPC ......... *H02M 3/33507* (2013.01); *H02M 1/32* (2013.01); *H02M 1/36* (2013.01);
(Continued)

(58) Field of Classification Search
CPC ................................................ H02M 3/33507
See application file for complete search history.

(56) References Cited

U.S. PATENT DOCUMENTS

2005/0024033 A1* 2/2005 Nakata ..................... H02M 1/36
323/282
2013/0033184 A1* 2/2013 Lee ..................... H05B 33/0827
315/186
(Continued)

FOREIGN PATENT DOCUMENTS

| CN | 104135146 A | 11/2014 |
|---|---|---|
| CN | 104917366 A | 9/2015 |

*Primary Examiner* — Jue Zhang
*Assistant Examiner* — Trinh Q Dang
(74) *Attorney, Agent, or Firm* — Brooks Kushman P.C.

(57) ABSTRACT

The present disclosure provides a soft-start power supply circuit, a method for controlling the same, and a display device. The soft-start power supply circuit includes: a soft-start circuitry configured to pull up a potential of a feedback voltage terminal to a potential of an input voltage terminal during a first phase of an operating cycle and to pull down the potential of the feedback voltage terminal to a potential of a ground terminal during a second phase of the operating cycle; a feedback operation circuitry configured to control a driving circuitry to be turned off during the first phase and control the driving circuitry to be turned on and off alternately during the second phase; a driving circuitry configured to, in an on state, output a signal of the input voltage terminal after rectifying and filtering by a rectifying and filtering circuitry to an output voltage terminal.

20 Claims, 5 Drawing Sheets

(51) Int. Cl.
  *H02M 1/44* (2007.01)
  *H02M 1/32* (2007.01)
  *H02M 1/36* (2007.01)
  *H02M 3/155* (2006.01)
  *H02M 7/5387* (2007.01)
  *H05B 33/08* (2006.01)

(52) U.S. Cl.
  CPC .............. *H02M 1/44* (2013.01); *H02M 3/155* (2013.01); *H02M 3/158* (2013.01); *H02M 7/5387* (2013.01); *H05B 33/0815* (2013.01)

(56) References Cited

U.S. PATENT DOCUMENTS

2013/0307501 A1* 11/2013 Kadanka .................. G05F 1/56
  323/274
2015/0303800 A1* 10/2015 Childs .................. H02M 3/158
  323/271
2016/0087595 A1* 3/2016 Gopalraju ............. H02M 3/158
  323/271
2016/0381748 A1* 12/2016 Hagino ............. H05B 33/0815
  315/186

* cited by examiner

SOFT-START POWER SUPPLY CIRCUIT, METHOD FOR CONTROLLING THE SAME, AND DISPLAY DEVICE

CROSS-REFERENCE TO RELATED APPLICATION

The present application claims priority to Chinese patent application No. 201610900365.9 filed on Oct. 14, 2016, which is incorporated herein by reference in its entirety.

TECHNICAL FIELD

The disclosure relates to a field of display driving technologies, and in particular to a soft-start power supply circuit, a method for controlling the same, and a display device.

BACKGROUND

During use of a display device such as a LCD (Liquid Crystal Display), a supply voltage is supplied by a power supply device. Since the power supply device may suffer huge current surge at an instant of starting up, overshoot may occur in a supply voltage output by the power supply device, thereby causing damage to an electronic element (e.g., a transistor) in the LCD.

SUMMARY

At least one embodiment of the present disclosure provides a soft-start power supply circuit, a method for controlling the same, and a display device.

At least one embodiment of the present disclosure employs the following technical solutions.

An aspect of the present disclosure provides a soft-start power supply circuit, including a feedback operation circuitry, a soft-start circuitry, a sampling circuitry, a driving circuitry and a rectifying and filtering circuitry; wherein, the soft-start circuitry is coupled to an input voltage terminal, a ground terminal and a feedback voltage terminal, and is configured to pull up a potential of the feedback voltage terminal to a potential of the input voltage terminal during a first phase of an operating cycle and to pull down the potential of the feedback voltage terminal to a potential of the ground terminal during a second phase of the operating cycle; the feedback operation circuitry is coupled to the ground terminal, the feedback voltage terminal and the driving circuitry, and is configured to control the driving circuitry to be turned off during the first phase such that no signal is output by an output voltage terminal, and to control the driving circuitry to be turned on and off alternately according to the potential of the feedback voltage terminal, during the second phase; the driving circuitry is coupled to the input voltage terminal and the rectifying and filtering circuitry, and is configured to output a signal of the input voltage terminal to the rectifying and filtering circuitry, in an on state; and the rectifying and filtering circuitry is coupled to the output voltage terminal, and is configured to rectify and filter the signal input into the rectifying and filtering circuitry, and output the rectified and filtered signal to the output voltage terminal, so as to enable a voltage output by the output voltage terminal during the second phase to increase gradually to a supply voltage.

Optionally, the soft-start power supply circuit further includes a sampling circuitry, wherein, the sampling circuitry is coupled to the output voltage terminal, the ground terminal and the feedback voltage terminal, and is configured to sample the supply voltage output by the output voltage terminal during a third phase of the operating cycle, and to output the sampled signal to the feedback voltage terminal, such that the feedback operation circuitry is configured to control the driving circuitry to adjust the supply voltage output by the output voltage terminal according to a voltage of the feedback voltage terminal.

Optionally, the soft-start circuitry includes a first switch transistor, a first resistor, a second resistor, a first capacitor, a second capacitor and a diode; wherein a first electrode of the first switch transistor is coupled to the input voltage terminal, a gate electrode of the first switch transistor is coupled to an end of the first resistor, and a second electrode of the first switch transistor is coupled to an anode of the diode; the other end of the first resistor is coupled to the input voltage terminal; an end of the second resistor is coupled to the anode of the diode, and the other end of the second resistor is coupled to the ground terminal; a cathode of the diode is coupled to the feedback voltage terminal; an end of the first capacitor is coupled to the gate electrode of the first switch transistor, and the other end of the first capacitor is coupled to the ground terminal; and an end of the second capacitor is coupled to the anode of the diode, and the other end of the second capacitor is coupled to the ground terminal.

Optionally, a resistance value of the first resistor is proportional to a duration of the first phase.

Optionally, a resistance value of the second resistor is inversely proportional to a rate at which the voltage output by the output voltage terminal during the second phase gradually increases to the supply voltage.

Optionally, the first switch transistor is a P-type transistor, wherein, during the first phase, the first switch transistor is in the on state, and during the second phase, the first switch transistor is in an off state.

Optionally, the feedback operation circuitry includes an operational amplifier, a comparator, an operational-amplifier resistor and an operational-amplifier capacitor; wherein a first input terminal of the operational amplifier is coupled to a reference voltage terminal, a second input terminal of the operational amplifier is coupled to the feedback voltage terminal, and an output terminal of the operational amplifier is coupled to a second input terminal of the comparator; a first input terminal of the comparator is coupled to a triangular wave signal terminal, and an output terminal of the comparator is coupled to the driving circuitry; an end of the operational-amplifier resistor is coupled to the feedback voltage terminal, and the other end of the operational-amplifier resistor is coupled to the operational-amplifier capacitor; and the other end of the operational-amplifier capacitor is coupled to the output terminal of the operational amplifier.

Optionally, the driving circuitry includes a second switch transistor; wherein a gate electrode of the second switch transistor is coupled to the feedback operation circuitry, and a first electrode of the second switch transistor is coupled to the input voltage terminal, and a second electrode of the second switch transistor is coupled to the rectifying and filtering circuitry. Further, the second switch transistor is a P-type transistor, wherein, during the first phase, the second switch transistor is in the on state; and during the second phase, the second switch transistor is turned on and off alternately.

Optionally, the rectifying and filtering circuitry includes a rectifying and filtering inductor and a rectifying and filtering capacitor; an end of the rectifying and filtering inductor is coupled to the driving circuitry, and the other end of the rectifying and filtering inductor is coupled to the output voltage terminal; and an end of the rectifying and filtering capacitor is coupled to the output voltage terminal, and the other end of the rectifying and filtering capacitor is coupled to the ground terminal.

Optionally, the sampling circuitry includes a first sampling resistor and a second sampling resistor; and an end of the first sampling resistor is coupled to the output voltage terminal, and the other end the first sampling resistor is coupled to the feedback voltage terminal; and an end of the second sampling resistor is coupled to the feedback voltage terminal, and the other end the second sampling resistor is coupled to the ground terminal.

Another aspect of at least one embodiment of the present disclosure provides a display device, including any one of the soft-start power supply circuits described above.

Another aspect of at least one embodiment of the present disclosure provides a method for controlling a soft-start power supply circuit, the soft-start power supply circuit including a feedback operation circuitry, a soft-start circuitry and a driving circuitry, and an operating cycle comprising a first phase and a second phase, and the method including: during the first phase, pulling up, by the soft-start circuitry, a potential of a feedback voltage terminal to a potential of an input voltage terminal, and controlling, by the feedback operation circuitry, the driving circuitry to be turned off according to the potential of the feedback voltage terminal, such that no signal is output by an output voltage terminal; and during the second phase, pulling down, by the soft-start circuitry, the potential of the feedback voltage terminal to a potential of a ground terminal, controlling, by the feedback operation circuitry, the driving circuitry to be turned on and off alternately according to the potential of the feedback voltage terminal, outputting, by the driving circuitry in an on state, a signal of the input voltage terminal to the rectifying and filtering circuitry, rectifying and filtering, by the rectifying and filtering circuitry, the signal input into the rectifying and filtering circuitry, and outputting, by the rectifying and filtering circuitry, the rectified and filtered signal to the output voltage circuitry, so as to enable a voltage output by the output voltage terminal during the second phase to increase gradually to a supply voltage; wherein, the soft-start circuitry is coupled to the input voltage terminal, the ground terminal and the feedback voltage terminal, the feedback operation circuitry is coupled to the ground terminal, the feedback voltage terminal and the driving circuitry, the driving circuitry is coupled to the input voltage terminal and the rectifying and filtering circuitry, and the rectifying and filtering circuitry is coupled to the output voltage terminal.

Optionally, the soft-start power supply circuit further includes a sampling circuitry and the operating cycle further includes a third phase, and the method further includes: during the third phase, sampling the supply voltage output by the output voltage terminal, and outputting the sampled signal to the feedback voltage terminal, such that the feedback operation circuitry is configured to control the driving circuitry to adjust the supply voltage output by the voltage output terminal according to a voltage of the feedback voltage terminal, wherein the sampling circuitry is coupled to the output voltage terminal, the ground terminal and the feedback voltage terminal.

Optionally, the soft-start circuitry includes a first switch transistor, a first resistor, a second resistor, a first capacitor, a second capacitor and a diode, the feedback operation circuitry includes an operational amplifier, a comparator, an operational-amplifier resistor and an operational-amplifier capacitor, the driving circuitry includes a second switch transistor; the rectifying and filtering circuitry includes a rectifying and filtering inductor and a rectifying and filtering capacitor, and the first switch transistor and the second switch transistor are P-type transistors; and during the first phase, the following steps are performed: turning the first switch transistor on, charging the first capacitor through the first resistor by a high-level output of the input voltage terminal, and charging, by the first capacitor, a gate electrode of the first switch transistor; wherein, the first switch transistor remains in an on state in the case of $U_{IN}-U_A>U_{Q1th}$, and $U_{IN}$ is a voltage output by the input voltage terminal, $U_A$ is a gate voltage of the first switch transistor, and $U_{Q1th}$ is a threshold voltage of the first switch transistor; outputting the high-level output of the input voltage terminal to an anode of the diode through the first switch transistor that is in the on state, and charging the second capacitor; in the case that a voltage of the anode of the diode is greater than a voltage of a cathode, causing the diode to be in an on state, and pulling up the potential of the feedback voltage terminal to the potential of the input voltage terminal; and supplying, by an output terminal of the operational amplifier, a low-level output, and receiving, by the comparator, the low-level output from the output terminal of the operational amplifier, and supplying, by the comparator, a high-level output; and turning the second switch transistor off.

Optionally, the soft-start circuitry includes a first switch transistor, a first resistor, a second resistor, a first capacitor, a second capacitor and a diode, the feedback operation circuitry includes an operational amplifier, a comparator, an operational-amplifier resistor and an operational-amplifier capacitor, the driving circuitry includes a second switch transistor, the rectifying and filtering circuitry includes a rectifying and filtering inductor and a rectifying and filtering capacitor, and the first switch transistor and the second switch transistor are P-type transistors; and the following steps are performed during the second phase: turning the first switch transistor off in the case of $U_{IN}-U_A<U_{Q1th}$, discharging the second capacitor, and gradually pulling down the potential of the feedback voltage terminal to the potential of the ground terminal through the diode, wherein $U_{IN}$ is a voltage output by the input voltage terminal, $U_A$ is a gate voltage of the first switch transistor, and $U_{Q1th}$ is a threshold voltage of the first switch transistor; supplying, by an output terminal of the operational amplifier, an output with a high level gradually increasing, receiving, by the comparator, the high-level output from the output terminal of the operational amplifier, outputting a square signal with a duty ratio gradually decreasing, and turning the second switch transistor on and off alternately under the control of the square signal; and outputting, by the second switch transistor in an on state, the signal of the input voltage terminal to the rectifying and filtering inductor and the rectifying and filtering capacitor for rectifying and filtering, and then outputting the rectified and filtered signal to the output voltage terminal.

Optionally, the soft-start circuitry includes a first switch transistor, a first resistor, a second resistor, a first capacitor, a second capacitor and a diode; the feedback operation circuitry includes an operational amplifier, a comparator, an operational-amplifier resistor and an operational-amplifier capacitor, the driving circuitry includes a second switch transistor, the rectifying and filtering circuitry includes a rectifying and filtering inductor and a rectifying and filtering capacitor, the sampling circuitry includes a first sampling resistor and a second sampling resistor, and the first switch transistor and the second switch transistor are P-type transistors; and the following steps are performed during the third phase: in the case that the voltage of the output voltage terminal rises to the supply voltage, sampling, by the first sampling resistor and the second sampling resistor, the voltage of the output voltage terminal, and outputting the sampled voltage to the feedback voltage terminal; in the case that a voltage of a cathode of the diode coupled to the feedback voltage terminal is greater than a voltage of an anode of the diode, causing the diode to be in a reverse bias state; and; receiving, by the operational amplifier, the voltage of the feedback voltage terminal; in the case that the voltage of the feedback voltage terminal is less than the supply voltage, receiving, by the comparator, a high-level output from an output terminal of the operational amplifier, and outputting a square signal; and in the case that the square signal is configured to control the second switch transistor to be in an on state, outputting, by the second switch transistor, the signal of the input voltage terminal to the rectifying and filtering inductor and the rectifying and filtering capacitor for rectifying and filtering, and then outputting the rectified and filtered signal to the output voltage terminal.

Optionally, a resistance value of the first resistor is proportional to a duration of the first phase.

Optionally, a resistance value of the second resistor is inversely proportional to a rate at which the voltage output by the output voltage terminal during the second phase gradually increases to the supply voltage.

BRIEF DESCRIPTION OF THE DRAWINGS

To illustrate technical solutions of embodiments of the present disclosure or the related art more clearly, a brief introduction will be given to drawings needed to describe the embodiments or the related art. Apparently, the drawings described below are merely some embodiments of the present disclosure. Based on these drawings, a person skilled in the art may obtain other drawings without any creative efforts.

REFERENCE SIGNS

10—soft-start circuitry 20—feedback operation circuitry 30—driving circuitry 40—rectifying and filtering circuitry 50—sampling circuitry

DETAILED DESCRIPTION

In order to make the objectives, the technical solutions and the advantages of embodiments of the present disclosure clearer, the technical solutions of the embodiments of the present disclosure will be described clearly and fully hereinafter in conjunction with the drawings of the embodiments of the present disclosure. Obviously, the described embodiments are merely a part of, rather than all of, the embodiments of the present disclosure. Based on the described embodiments of the present disclosure, a person skilled in the art may obtain all other embodiments, which fall within the scope of the present disclosure.

Figure 1:
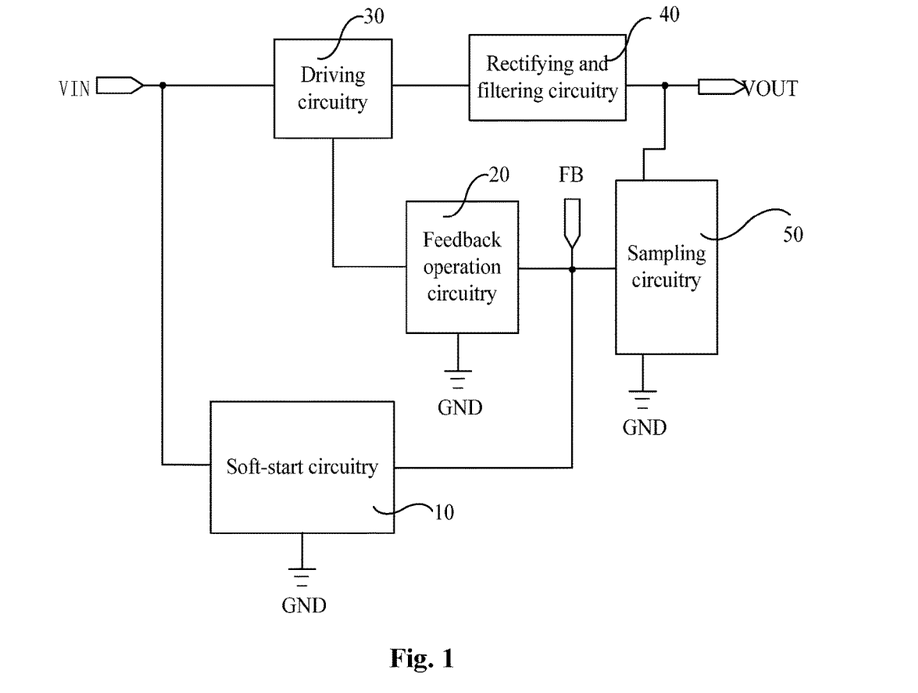
FIG. 1 is a schematic diagram of a structure of a soft-start power supply circuit provided by at least one embodiment of the present disclosure.

According to at least one embodiment of the present disclosure, a soft-start power supply circuit is provided, including a soft-start circuitry 10, a feedback operation circuitry 20, a driving circuitry 30, a rectifying and filtering circuitry 40 and a sampling circuitry 50, as shown in FIG. 1.

The soft-start circuitry 10 is coupled to an input voltage terminal VIN, a ground terminal GND and a feedback voltage terminal FB, and is configured to pull up a potential of the feedback voltage terminal FB to a potential of the input voltage terminal VIN, or configured to pull down a potential of the feedback voltage terminal FB to a potential of the ground terminal GND.

The feedback operation circuitry 20 is coupled to the ground terminal GND, the feedback voltage terminal FB and the driving circuitry 30, and is configured to control on and off of the driving circuitry 30 according to a voltage of the feedback voltage terminal FB.

Furthermore, the driving circuitry 30 is further coupled to the input voltage terminal VIN and the rectifying and filtering circuitry 40. In an on state, the driving circuitry 30 is configured to output a signal of the input voltage terminal VIN to the rectifying and filtering circuitry 40. When the driving circuitry 30 is in an off state, no signal is output to the rectifying and filtering circuitry 40. In this case, when the feedback operation circuitry 20 inputs a signal such as a square signal to the driving circuitry 30 according to a voltage of the feedback voltage terminal FB, the driving circuitry 30 is turned on and off alternately. Thus, a duty ratio of a signal output by the driving signal 30 can be controlled by controlling a duty ratio of the above square signal.

The rectifying and filtering circuitry 40 is coupled to an output voltage terminal VOUT, and is configured to output a signal input into the rectifying and filtering circuitry 40 to the output voltage terminal VOUT after rectifying and filtering. It should be noted that, in the case that a direct voltage is input into the input voltage terminal VIN, a direct-current (DC) voltage can be supplied to the output voltage terminal VOUT through the rectifying and filtering circuitry 40.

The sampling circuitry 50 is coupled to the output voltage terminal VOUT, the ground terminal GND and the feedback voltage terminal FB, and is configured to sample a signal of the output voltage terminal VOUT and output the sampled signal to the feedback voltage terminal FB. Thus, when a supply voltage is output by the output voltage terminal VOUT, a signal of the output voltage terminal VOUT may be sampled by the sampling circuitry 50, and the sampled signal may be output to the feedback operation circuitry 20 through the feedback voltage terminal FB. Further, by controlling an output signal of the driving circuitry 30 by the feedback operation circuitry 20, adjustment of a signal output by the output voltage terminal VOUT can be finally achieved, so as to ensure that the supply voltage output by the output voltage terminal VOUT is in a steady state.

For ease of understanding, a specific operating cycle of the soft-start power supply circuit will be described in detail below.

Figure 2:
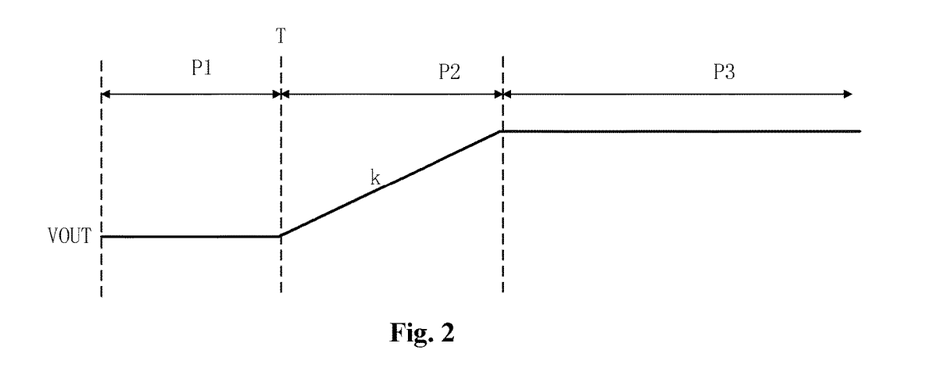
FIG. 2 is a schematic diagram of an operating cycle of the soft-start power supply circuit shown in FIG. 1.

As shown in FIG. 2, an operating cycle of the soft-start power supply circuit may include a first phase P1, a second phase P2 and a third phase P3.

Specifically, in the first phase P1:

The soft-start circuitry 10 pulls up the feedback voltage terminal FB to the input voltage terminal VIN, and at this point, the feedback operation circuitry 20 may control the driving circuitry 30 to be in an off state all the time according to a voltage of the feedback voltage terminal FB, and thus no signal is output by the driving circuitry 30, such that no signal is output by the output voltage terminal VOUT coupled to the driving circuitry 30 through the rectifying and filtering circuitry 40. As such, by controlling a duration in which the soft-start circuitry 10 pulls up a potential of the feedback voltage terminal FB to a potential of the input voltage terminal VIN, a duration of the first phase P1 may be controlled, to achieve an objective of controlling when the output voltage terminal VOUT outputs a supply voltage.

For example, in the cast that a duration in which the soft-start circuitry 10 pulls up a potential of the feedback voltage terminal FB to a potential of the input voltage terminal VIN is longer, the duration of the first phase P1 may be increased, and time T that the output voltage terminal VOUT outputs the supply voltage is delayed accordingly. Thus, when the output voltage terminal VOUT outputs the supply voltage can be controlled flexibly by those skilled in the art as needed.

Figure 3:
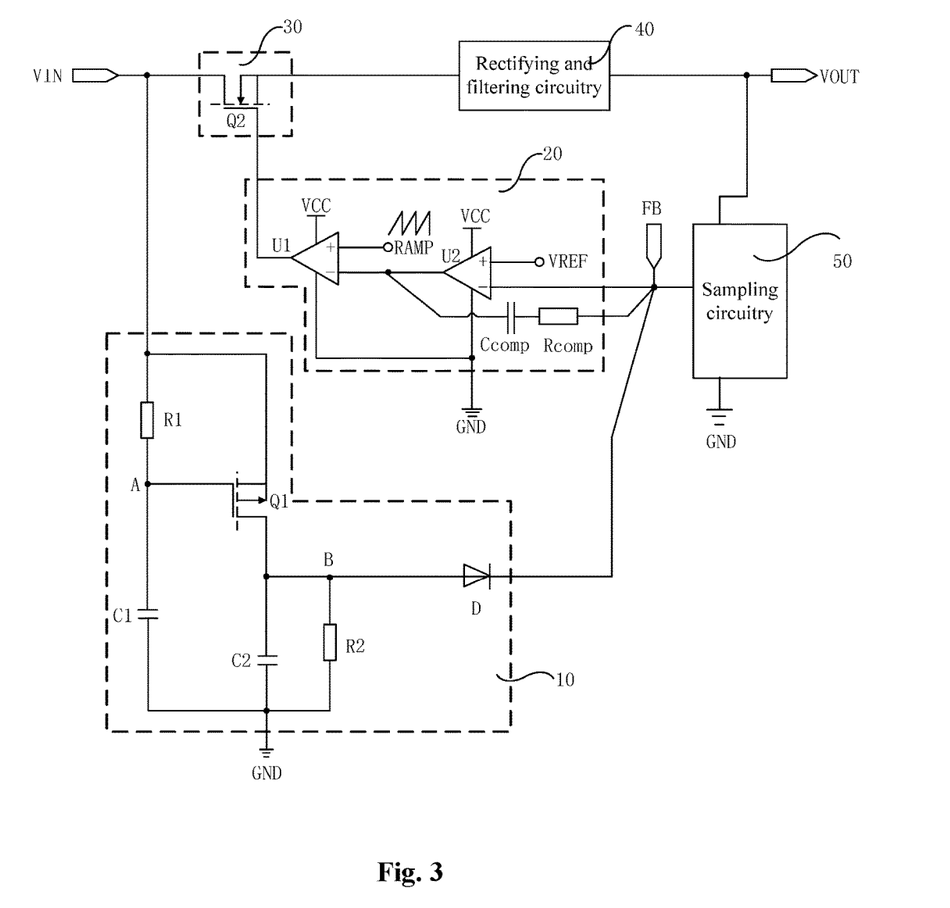
FIG. 3 is a diagram of a specific structure of some circuitries of the soft-start power supply circuit shown in FIG. 1.

To achieve the above objectives, as schematically shown in FIG. 3, the above soft-start circuitry 10 may include a first switch transistor Q1, a first resistor R1, a second resistor R2, a first capacitor C1, a second capacitor C2 and a diode D.

Specifically, a first electrode of the first switch transistor Q1 is coupled to the input voltage terminal VIN, a gate electrode of the first switch transistor Q1 is coupled to an end of the first resistor R1, and a second electrode of the first switch transistor Q1 is coupled to an anode of the diode D. In at least one embodiment of the present disclosure, an input of the input voltage terminal VIN is at a high level, and thus the first switch transistor Q1 is preferably a P-type transistor, so as to make the circuit configuration simple.

The other end of the first resistor R1 is coupled to the input voltage terminal VIN.

An end of the second resistor R2 is coupled to the anode of the diode D, and the other end is coupled to the ground terminal GND.

A cathode of the diode D is coupled to the feedback voltage terminal FB.

An end of the first capacitor C1 is coupled to the gate electrode of the first switch transistor Q1, and the other end is coupled to the ground terminal GND.

An end of the second capacitor C2 is coupled to the anode of the diode D, and the other end is coupled to the ground terminal GND.

On this basis, the feedback operation circuitry 20 includes an operational amplifier U2, a comparator U1 and an operational-amplifier resistor Rcomp and an operational-amplifier capacitor Ccomp.

Specifically, a first input terminal of the operational amplifier U2 is coupled to a reference voltage terminal VREF, a second input terminal of the operational amplifier U2 is coupled to the feedback voltage terminal FB, and an output terminal of the operational amplifier U2 is coupled to a second input terminal (i.e., an inverting terminal) of the comparator U1.

A first input terminal (i.e., non-inverting terminal) of the comparator U1 is coupled to a triangular wave signal terminal RAMP, wherein the triangular wave signal terminal RAMP is configured to output a triangular wave signal. Additionally, an output terminal of the comparator is coupled to the driving circuitry 30.

Additionally, to enable the comparator U1 and the operational amplifier U2 to operate normally, both of the comparator U1 and the operational amplifier U2 need to be coupled to the operating voltage terminal VCC and the ground terminal GND.

An end of the operational-amplifier resistor Rcomp is coupled to the feedback voltage terminal FB, and the other end is coupled to the operational-amplifier capacitor Ccomp. The other end of the operational-amplifier capacitor is coupled to the output terminal of the operational amplifier U2.

On this basis, the driving circuitry 30 includes a second switch transistor Q2. A gate electrode of the second switch transistor Q2 is coupled to the feedback operation circuitry 20. It should be noted that, when the feedback operation circuitry 20 has a structure as described above, the gate electrode of the second switch transistor Q2 is coupled to the output terminal of the comparator U1. Furthermore, a first electrode of the second switch transistor Q2 is coupled to the input voltage terminal VIN, and a second electrode of the second switch transistor Q2 is coupled to the rectifying and filtering circuitry 40. Optionally, the second switch transistor Q2 is also a P-type transistor preferably.

On this basis, when the soft-start circuitry 10, the feedback operation circuitry 20 and the driving circuitry 30 have structures as described above, the above circuitries have the following operating processes during the first phase P1.

Figure 4:
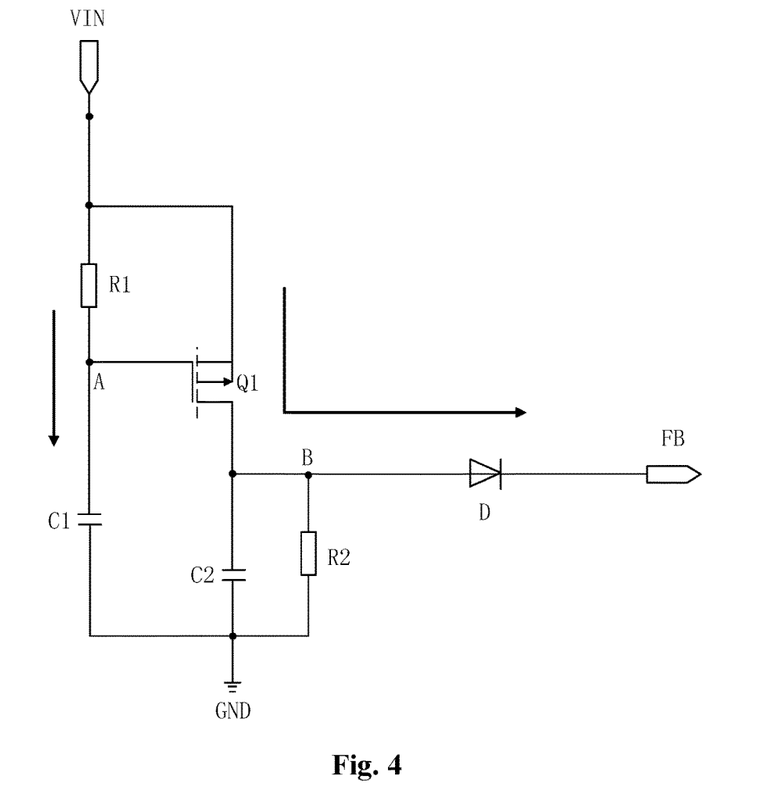
FIG. 4 is a schematic diagram of an operating process of the soft-start circuitry shown in FIG. 3 during a first phase.
Figure 5:
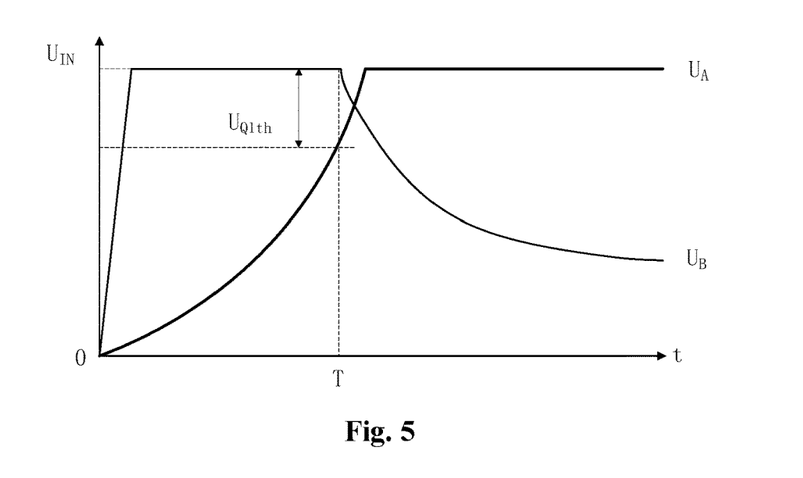
FIG. 5 is a schematic diagram of voltage changes of a node A and a node B in the soft-start circuitry shown in FIG. 3.

For the soft-start circuitry 10, when a high-level input begins to be supplied to the input voltage terminal VIN, due to the first resistor R1, a high-level output of the input voltage terminal VIN has not been transferred to a node A as shown in FIG. 4. Thus, an initial value of a voltage $U_A$ at the node A is 0, as shown in FIG. 5. In this case, when the first switch transistor Q1 is a P-type transistor, the first switch transistor Q1 is turned on. A high-level output of the input voltage terminal VIN charges the first capacitor C1 through the first resistor R1 along an arrow direction shown in FIG. 4. Furthermore, the first capacitor C1 charges the gate electrode of the first switch transistor Q1, that is, charges the node A. At this point, due to the first resistor R1, electric quantity stored within the first capacitor C1 gradually increases, such that a voltage charged by the first capacitor C1 into the gate electrode of the first switch transistor Q1 rises gradually.

In this case, since when the first switch transistor Q1 is in an on state, its gate-source voltage $U_{GS}$ and a threshold voltage $U_{Q1th}$ satisfy $U_{GS} < U_{Q1th}$, wherein, $U_{GS} = U_G - U_S = U_A - U_{IN}$. Thus, when $U_A - U_{IN} < U_{Q1th}$, i.e., $U_{IN} - U_A > U_{Q1th}$, the first switch transistor Q1 can remain in the on state, even though the voltage $U_A$ of the node A rises gradually due to the charging of the first capacitor C1. Furthermore, $U_A = U_{IN} - V_{R1}$, and thus it may be derived that $V_{R1} > U_{Q1th}$.

Here, $U_{IN}$ is a voltage of the input voltage terminal VIN, $U_{Q1th}$ is a threshold voltage of the first switch transistor Q1, and $V_{R1}$ is a voltage across the first resistor R1.

On this basis, the high-level output of the input voltage terminal VIN is output to the anode of the diode D through the first switch transistor Q1 that is in the on state along an arrow direction shown in FIG. 4, and charges the second capacitor C2. In this case, with increasing of a voltage $U_B$ of a node B, a voltage of the anode of the diode is greater than a voltage of the cathode, and thus the diode D is turned on, and a potential of the feedback voltage terminal FB is gradually pulled up to a potential of the input voltage terminal VIN.

On this basis, when the potential of the feedback voltage terminal FB is pulled up to the potential of the input voltage terminal VIN, as shown in FIG. 3, a high-level input is supplied to the second input terminal of the operation amplifier U2, such that the operation amplifier U2 supplies a low-level output to the first input terminal of the comparator U1, under the combined action of the operational-amplifier resistor Rcomp, the operational-amplifier capacitor Ccomp and the reference voltage terminal VREF.

On this basis, a comparison operation is performed by the comparator U1 on a low level of its first input terminal and the triangular wave signal terminal RAMP of its second input terminal, such that the comparator U1 supplies an output at a constant high level. In this case, the second switch transistor Q2 of P-type remains in an off state all the time during the first phase P1 described above, such that no signal is output by the driving circuitry 30 to the rectifying and filtering circuitry 40, and thus no signal is output by the output voltage terminal VOUT coupled to the driving circuitry 30 through the rectifying and filtering circuitry 40 during the first phase P1, as shown in FIG. 2.

It should be noted that, as the voltage $U_A$ of the node A gradually increases under the charging action of the first capacitor C1, the gate-source voltage $U_{GS}$ and the threshold voltage $U_{Q1th}$ of the first switch transistor Q1 satisfy $U_{GS}=U_G-U_S=U_A-U_{IN}>U_{Q1th}$, i.e., $U_{IN}-U_A<U_{Q1th}$, and the first switch transistor Q1 is turned off, and thus the first phase P1 described above ends.

Therefore, when the duration of the first phase P1 needs to be extended, a resistance value of the first resistor R1 may be increased, to increase a time period during which the first resistor R1 charges the first capacitor C1, thereby extending a duration in which the gate voltage $U_A$ of the first switch transistor Q1 satisfies $U_A<U_{IN}-U_{Q1th}$, that is, a duration of the first switch transistor Q1 in the on state is increased, and finally a duration in which the soft-start circuitry 10 pulls up the potential of the feedback voltage terminal FB to the potential of the input voltage terminal VIN is increased, and time T at which the output voltage terminal VOUT outputs a supply voltage (as shown in FIGS. 2 and 5) is delayed accordingly. On the contrary, in the case that a duration of the soft-start reduction phase P1 needs to be extended, the adjustment process is similar as that described above, which will not be repeated here. As such, soft-start time can be set and adjusted flexibly by controlling the resistance value of the first resistor R1, thereby controlling when the output voltage terminal VOUT outputs the supply voltage.

In light of the above, the first phase P1 described above is also referred to as a soft-start delay phase.

Thereafter, when the gate voltage $U_A$ of the first switch transistor Q1 and the voltage $U_{IN}$ of the input voltage terminal VIN satisfy $U_{IN}-U_A<U_{Q1th}$, the first switch transistor Q1 is turned off, and the first phase P1 described above ends, to enter the second phase P2 as shown in FIG. 2.

Figure 6:
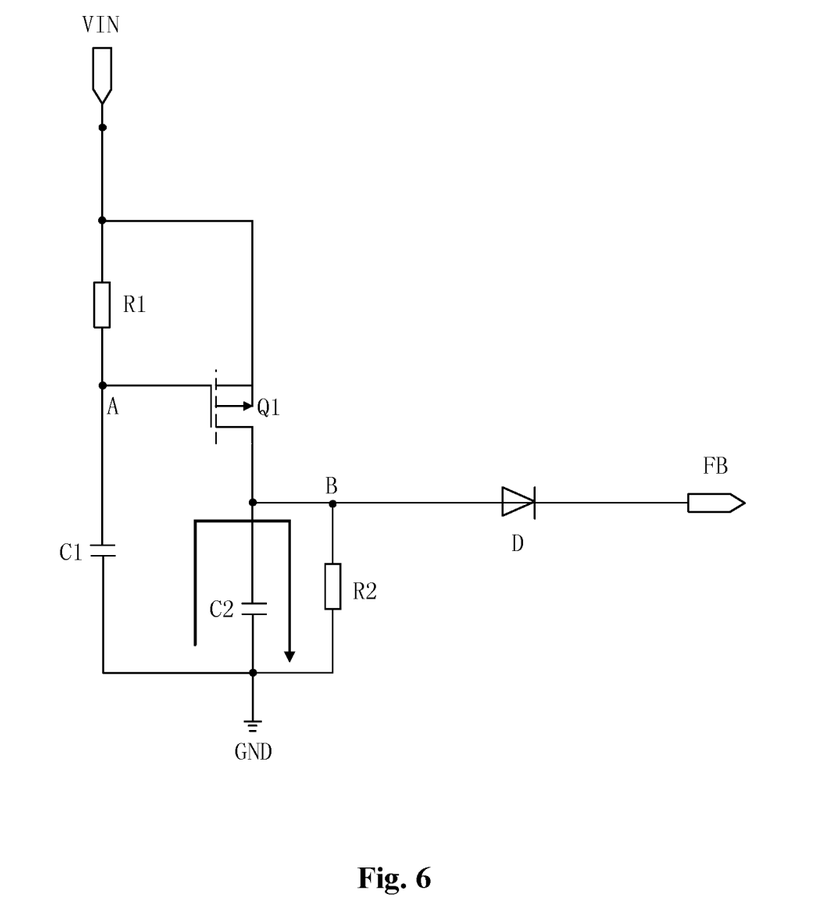
FIG. 6 is a schematic diagram of an operating process of the soft-start circuitry shown in FIG. 3 during a second phase.

In the second phase P2, the soft-start circuitry 10 pulls down the potential of the feedback voltage terminal FB to a potential of the ground terminal GND. Specifically, when the soft-start circuitry 10 has a structure as shown in FIG. 3, the second capacitor C2 discharges through the second resistor R2 along an arrow direction as shown in FIG. 6. During the discharging of the second capacitor C2, due to the second resistor R2, a potential of the anode of the diode D is gradually pulled down to the potential of the ground terminal GND, that is, a voltage $U_B$ of the node B is gradually pulled down, such that the potential of the feedback voltage terminal FB is gradually pulled down to the potential of the ground terminal GND through the diode D.

On this basis, when the potential of the feedback voltage terminal FB is pulled down to the potential of the ground terminal GND, as shown in FIG. 3, a low level is supplied to the second input terminal of the operation amplifier U2, such that the operation amplifier U2 outputs a high level to the first input terminal of the comparator U1, under the combined action of the operational-amplifier resistor Rcomp, the operational-amplifier capacitor Ccomp and the reference voltage terminal VREF.

On this basis, a comparison operation is performed by the comparator U1 on a high level of its first input terminal and the triangular wave signal terminal RAMP of its second input terminal, such that the comparator outputs a matrix square wave, thereby controlling the second switch transistor Q2 forming the driving circuitry 30 to be on and off alternately. In this case, when the potential of the feedback voltage terminal FB gradually decreases, a duty ratio of the above matrix square wave output by the comparator U1 gradually decreases, and a duration in which the second switch transistor Q2 is in the turn-on state gradually increases after the gate electrode of the second switch transistor Q2 of P-type receives the above square wave with the duty ratio gradually decreasing. At this point, a duty ratio of a signal output by the second switch transistor Q2 to the rectifying and filtering circuitry 40 increases from zero at time T as shown in FIG. 5, and the output voltage terminal VOUT described above outputs a signal (e.g., a voltage). In this case, the signal output by the output voltage terminal VOUT gradually increases after rectifying and filtering by the rectifying and filtering circuitry 40, and at the end of the second phase P2, the voltage output by the output voltage terminal VOUT rises to the supply voltage, such that the output voltage terminal VOUT outputs a supply voltage, thereby realizing soft start. Thus, the second phase P2 described above is a soft-start phase.

It should be noted that, for the soft-start circuitry 10, when the resistance value of the second resistor R2 increases, a rate at which the second capacitor C2 discharges through the second resistor R2 along an arrow direction shown in FIG. 6 decreases, thereby extending a duration in which the potential of the feedback voltage terminal FB is pulled down to the potential of the ground terminal GND, such that a rate at which a duty ratio of a signal output by the second switch transistor Q2 to the rectifying and filtering circuitry 40 begins to increase from zero decreases, so as to reduce a slope k of the signal output by the output voltage terminal VOUT (as shown in FIG. 2), thereby further improving effects of soft start and making a startup waveform more smooth.

In summary, the voltage of the output terminal of the operational amplifier U2 can control the duty ratio of the signal output by the second switch transistor Q2, so as to control the duration of the first phase P1 and control a slope of the signal output by the output voltage terminal VOUT during the second phase P2 is in a climbing phase. The output terminal of the above operational amplifier U2 is generally packaged within a driving chip, which is difficult to lead out independently. However, the present disclosure can achieve the above objective by controlling the potential of the feedback voltage terminal FB coupled to the second input terminal of the operational amplifier U2.

Figure 7:
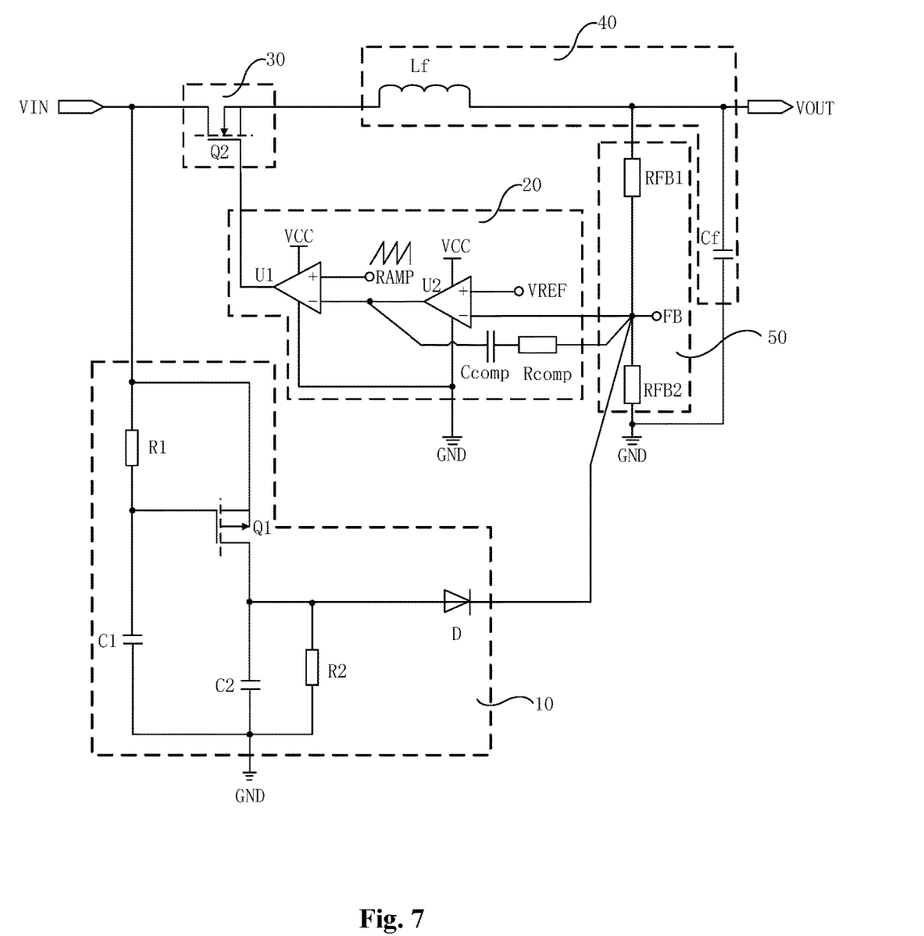
FIG. 7 is a schematic diagram of a specific structure of the soft-start power supply circuit shown in FIG. 1.

Furthermore, in order that the rectifying and filtering circuitry 40 can rectify and filter a signal output by the second switch transistor Q2 forming the driving circuitry 30, the rectifying and filtering circuitry 40 may include a rectifying and filtering inductor Lf and a rectifying and filtering capacitor Cf, as shown in FIG. 7.

Here, an end of the rectifying and filtering inductor Lf is coupled to the driving circuitry 30, and the other end is coupled to the output voltage terminal VOUT. When the driving circuitry 30 has a structure as described above, an end of the rectifying and filtering inductor Lf is coupled to the second electrode of the second switch transistor Q2. Furthermore, an end of the rectifying and filtering capacitor Cf is coupled to the output voltage terminal VOUT, and the other end is coupled to the ground terminal GND.

Finally, when the output voltage terminal VOUT gradually rises to the supply voltage, the second phase P2 described above ends, and the soft-start power supply circuit goes into a third phase P3, as shown in FIG. 2.

In this phase, the sampling circuitry 50 samples a supply voltage output by the output voltage terminal VOUT, and feeds it back to the feedback voltage terminal FB. At this point, since the voltage of the anode of the diode has been pulled down to the ground terminal GND during the second phase P2, the voltage supplied by the sampling circuitry 50 to the feedback voltage terminal FB is greater than the voltage of the anode of the diode D of the soft-start circuitry 10, such that the diode D is in a reverse bias state. Since the diode D is in the reverse bias state, the potential of the feedback voltage terminal FB is isolated, such that the soft-start circuitry 10 will have no effect on the potential of the feedback voltage terminal FB. At this time, the soft-start circuitry 10 exits the operating state, and the voltage stored in the first capacitor C1 of the soft-start circuitry 10 gradually discharges to 0 V.

In this case, to ensure that the supply voltage output by the output voltage terminal VOUT during the third phase P3 is constant, the sampling circuitry 50 may sample the voltage output by the output voltage terminal VOUT in real time, and output it to the feedback voltage terminal FB, and then the above feedback operation circuitry 20 controls the driving circuitry 30 to adjust the supply voltage output by the signal output terminal VOUT, according to the voltage of the feedback voltage terminal FB.

Specifically, the sampling circuitry 50 may include a first sampling resistor RFB1 and a second sampling resistor RFB2, as shown in FIG. 7.

Here, an end of the first sampling resistor RFB1 is coupled to the output voltage terminal VOUT, and the other end is coupled to the feedback voltage terminal FB. An end of the second sampling resistor RFB2 is coupled to the feedback voltage terminal FB, and the other end is coupled to the ground terminal GND.

On this basis, when the above diode D is in the reverse bias state, a voltage of the cathode of the diode D (i.e., a voltage $U_{FB}$ of the feedback voltage terminal FB) and a voltage $U'$ of the anode of the diode D satisfy the following relationship:

$$U_{FB} > U' \quad (1)$$

$$\text{Wherein, } U_{FB} = U_{OUT} \times \frac{RFB2}{RFB1 + RFB2} \quad (2)$$

$$U' = U_B - U_D \quad (3)$$

Thus, it may be derived from the above formulae that, $$U_{OUT} \times \frac{RFB2}{RFB1 + RFB2} > U_B - U_D \quad (4)$$

Wherein, $U_D$ is a voltage drop of the diode D.

When the above voltage $U_{OUT}$ of the output voltage terminal VOUT, sampled by the sampling circuitry 50 is less than the supply voltage, the comparator U1 receives a high-level output of the operational amplifier U2, compares the high level with a signal output by the triangular wave signal terminal, and outputs a square signal. When the second switch transistor Q2 is in an on state under the control of the square signal, signals of the input voltage terminal VIN are output by the second switch transistor Q2 to the rectifying and filtering circuitry 40 in sequence, and are output to the output voltage terminal VOUT after rectifying and filtering by the rectifying and filtering 40, so as to compensate for the voltage $U_{OUT}$ output by the output voltage terminal VOUT to ensure that a constant supply voltage can be output.

In summary, when the soft-start power supply circuit enters the third phase P3, the supply voltage is output by the output voltage terminal VOUT. In this case, the sampling circuitry 50 may sample the signal of the output voltage terminal VOUT, and output it to the feedback operation circuitry 20 through the feedback voltage terminal FB. Further, adjustment of the signal output by the output voltage terminal VOUT can be finally realized by controlling, by the feedback operation circuitry 20, the output signal of the driving circuitry 30, to ensure that the supply voltage output by the output voltage terminal VOUT is in a steady state. Thus, the above third phase P3 is a supply voltage output phase.

At least one embodiment of the present disclosure provides a display device, including any one of the soft-start circuits as described above that has same structures and effects as that of the soft-start power supply circuits provided by the above embodiments. The structures and effects of the soft-start power supply circuits have been described in detail in the previous embodiments, and will not be repeated here.

At least one embodiment of the present disclosure provides a method for controlling any one of the soft-start power supply circuits as described above. An operating cycle includes a first phase P1, a second phase P2 and a third phase P3, as shown in FIG. 2.

Specifically, in the first phase P1, the following steps are performed.

Firstly, the soft-start circuitry 10 as shown in FIG. 1 receives a signal of the input voltage terminal VIN, and a potential of the feedback voltage terminal FB is pulled up by the soft-start circuitry 10 to a potential of the input voltage terminal VIN.

Next, the feedback operation circuitry 20 controls the driving circuitry 30 to be in an off state all the time according to a voltage of the feedback voltage terminal FB. No signal is output by the driving circuitry 30, such that no signal is output by the output voltage terminal VOUT coupled to the driving circuitry 30 through the rectifying and filtering circuitry 40. As such, by controlling a duration in which the soft-start circuitry 10 pulls up the potential of the feedback voltage terminal FB to the potential of the input voltage terminal VIN, a duration of the first phase P1 may be controlled, to achieve an objective of controlling when the output voltage terminal VOUT outputs the supply voltage.

Furthermore, in the above second phase P2, the following steps are performed.

Firstly, the soft-start circuitry 10 prevents a signal input of the input voltage terminal VIN, and the potential of the feedback voltage terminal FB is pulled down by the soft-start circuitry 10 to a potential of the ground terminal GND.

Next, the feedback operation circuitry 20 controls the driving circuitry 30 to be in an on and off state alternately according to a voltage of the feedback voltage terminal FB. In the on state, the driving circuitry 30 outputs a signal of the input voltage terminal VIN to the rectifying and filtering circuitry 40. The rectifying and filtering circuitry 40 may rectify and filter an output signal of the driving circuitry 30, which is then output to the output voltage terminal VOUT.

In this case, when the potential of the feedback voltage terminal FB gradually decreases, a duty ratio of the signal output by the driving circuitry 30 begins to increase from zero at time T as shown in FIG. 5 during the second phase P2. The signal of the output voltage terminal VOUT is in a climbing phase during the second phase P2 as shown in FIG. 2, such that the signal output by the output voltage terminal VOUT gradually rises, and at the end of the second phase P2, the output voltage terminal VOUT is enabled to output a supply voltage, to achieve an objective of soft start.

On this basis, in the third phase P3, the following steps are performed.

In this phase, the voltage of the output voltage terminal VOUT rises to the supply voltage, and the supply voltage is output continuously, and at this time, the soft-start circuitry 10 exits the operating state.

Next, the sampling circuitry 50 samples a signal output by the output voltage terminal VOUT, and outputs it to the feedback voltage terminal FB. As such, by outputting to the feedback operation circuitry 20 through the feedback voltage terminal FB, the output signal of the driving circuitry 30 is further controlled by the feedback operation circuitry 20, and adjustment of the signal output by the output voltage terminal VOUT is finally achieved, to ensure that the supply voltage output by the output voltage terminal VOUT is in a steady state.

Further, the above soft-start circuitry 10 includes a first switch transistor Q1, a first resistor R1, a second resistor R2, a first capacitor C1, a second capacitor C2 and a diode D, as shown in FIG. 3. The feedback operation circuitry 20 includes an operational amplifier U2, a comparator U1 and an operational-amplifier resistor Rcomp and an operational-amplifier capacitor Ccomp. The driving circuitry 30 includes a second switch transistor Q2. As shown in FIG. 7, the rectifying and filtering circuitry 40 may include a rectifying and filtering inductor Lf and a rectifying and filtering capacitor Cf; and the sampling circuitry 50 includes a first sampling resistor RFB1 and a second sampling resistor RFB2, and the first switch transistor Q1 and the second switch transistor Q2 are P-type transistors.

In the above first phase P1, the following steps are performed.

Firstly, a gate electrode of the first switch transistor Q1 is at a low level, and the first switch transistor Q1 is turned on. Specifically, when a high-level input begins to be supplied to the input voltage terminal VIN, due to the first resistor R1, a high-level output of the input voltage terminal VIN has not been transferred to a node A as shown in FIG. 4. Thus, an initial value of a voltage $U_A$ at the node A is 0, as shown in FIG. 5. In this case, when the first switch transistor Q1 is a P-type transistor, the first switch transistor Q1 is turned on.

Next, a high-level output of the input voltage terminal VIN charges the first capacitor C1 through the first resistor R1 along an arrow direction shown in FIG. 4. Furthermore, the first capacitor C1 charges the gate electrode of the first switch transistor Q1, that is, charges the node A. At this time, under the action of the first resistor R1, electric quantity stored within the first capacitor C1 gradually increases, such that a voltage charged by the first capacitor C1 to the gate electrode of the first switch transistor Q1 rises gradually.

In this case, since when the first switch transistor Q1 is in an on state, its gate-source voltage $U_{GS}$ and a threshold voltage $U_{Q1th}$ satisfy $U_{GS} < U_{Q1th}$; wherein, $U_{GS} = U_G - U_S = U_A - U_{IN}$. Thus, when $U_A - U_{IN} < U_{Q1th}$, i.e., $U_{IN} - U_A > U_{Q1th}$, the first switch transistor Q1 can remain in the on state, even though the voltage $U_A$ of the node A rises gradually under the charging action of the first capacitor C1.

Here, $U_{IN}$ is a voltage of the input voltage terminal VIN, and $U_{Q1th}$ is the threshold voltage of the first switch transistor Q1.

On this basis, the high-level output of the input voltage terminal VIN is output to an anode of the diode D through the first switch transistor Q1 that is in the on state along an arrow direction shown in FIG. 4, and charges the second capacitor C2. In this case, with the increasing of a voltage $U_B$ of a node B, a voltage of the anode of the diode is greater than a voltage of a cathode, and thus the diode D is turned on, and the potential of the feedback voltage terminal FB is gradually pulled up to the potential of the input voltage terminal VIN.

Next, a low-level output is supplied by an output terminal of the operational amplifier U2, and the comparator U1 receives the low-level output from the output terminal of the operational amplifier U2, compares it with a signal output by a triangular wave signal terminal RAMP, and supplies a high-level output. The second switch transistor Q2 is turned off.

Specifically, when the potential of the feedback voltage terminal FB is pulled up to the potential of the input voltage terminal VIN, as shown in FIG. 3, a high level is input to a second input terminal of the operation amplifier U2, such that the operation amplifier U2 output a low level to a first input terminal of the comparator U1, under the combined action of the operational-amplifier resistor Rcomp, the operational-amplifier capacitor Ccomp and the reference voltage terminal VREF.

On this basis, a comparison operation is performed by the comparator U1 on a low level of its first input terminal and the triangular wave signal terminal RAMP of its second input terminal, such that the comparator U1 supplies an output at a constant high level. In this case, the second switch transistor Q2 of P-type remains in an off state all the time during the above first phase P1.

In this case, no signal is output by the driving circuitry 30 to the rectifying and filtering circuitry 40, and thus no signal is output by the output voltage terminal VOUT coupled to the driving circuitry 30 through the rectifying and filtering circuitry 40 during the first phase P1, as shown in FIG. 2.

It should be noted that, as the voltage $U_A$ of the node A gradually increases under the charging action of the first capacitor C1, the gate-source voltage $U_{GS}$ and the threshold voltage $U_{Q1th}$ of the first switch transistor Q1 satisfy $U_{GS} = U_G - U_S = U_A - U_{IN} > U_{Q1th}$, i.e., $U_{IN} - U_A < U_{Q1th}$, and thus the first switch transistor Q1 is turned off, and the first phase P1 described above ends.

In this case, when a duration of the first phase P1 needs to be extended, a resistance value of the first resistor R1 may be increased, to increase a time period during which the first resistor R1 charges the first capacitor C1, thereby extending a duration in which the gate voltage $U_A$ of the first switch transistor Q1 satisfies $U_A<U_{IN}-U_{Q1th}$, that is, a duration of the first switch transistor in the on state is increased, and finally a duration in which the soft-start circuitry 10 pulls up the potential of the feedback voltage terminal FB to the potential of the input voltage terminal VIN is increased, and time T at which the output voltage terminal VOUT outputs the supply voltage (as shown in FIGS. 2 and 5) is delayed accordingly. On the contrary, when a duration of soft-start reduction phase P1 needs to be extended, the adjustment process is similar as that described above, which will not be repeated here. As such, soft-start time can be set and adjusted flexibly by controlling the resistance value of the first resistor, thereby controlling when the output voltage terminal VOUT outputs the supply voltage.

Thereafter, when the gate voltage $U_A$ and the voltage $U_{IN}$ of the input voltage terminal VIN satisfy $U_{IN}-U_A<U_{Q1th}$, the first switch transistor is turned off, and the first phase P1 described above ends, to enter the second phase P2 as shown in FIG. 2.

In the second phase P2, the following steps are performed.

Since the first switch transistor Q1 is turned off, the second capacitor C2 discharges through the second resistor R2 along an arrow direction as shown in FIG. 6. During the discharging of the second capacitor C2, due to the second resistor R2, a potential of the anode of the diode D is gradually pulled down to the potential of the ground terminal GND, that is, a voltage $U_B$ of the node B is gradually pulled down, such that the potential of the feedback voltage terminal FB is gradually pulled down to the potential of the ground terminal GND.

Next, the output terminal of the operational amplifier U2 supplies an output with a high level gradually increasing, and the comparator U1 receives the high-level output from the output terminal of the operational amplifier U2, compares it with a signal output by the triangular wave signal terminal RAMP, and outputs a square signal with a duty ratio gradually decreasing. Under the control of the square signal, the second switch transistor Q2 is turned on and off alternately, and a duty ratio of a signal output by the second switch transistor Q2 gradually increases.

Specifically, when the potential of the feedback voltage terminal FB is pulled down to the potential of the ground terminal GND, as shown in FIG. 3, a low level is input to the second input terminal of the operation amplifier U2, such that the operation amplifier U2 output a high level to the first input terminal of the comparator U1, under the combined action of the operational-amplifier resistor Rcomp, the operational-amplifier capacitor Ccomp and the reference voltage terminal VREF.

On this basis, a comparison operation is performed by the comparator U1 on a high level of its first input terminal and the triangular wave signal terminal RAMP of its second input terminal, such that the comparator U1 outputs a matrix square wave, thereby controlling the second switch transistor Q2 forming the driving circuitry 30 to be on and off alternately. In this case, when the potential of the feedback voltage terminal FB gradually decreases, a duty ratio of the matrix square wave output by the comparator U1 gradually decreases, and a duration in which the second switch transistor Q2 is in the on state gradually increases after the gate electrode of the second switch transistor Q2 of P-type receives the square wave with the duty ratio gradually decreasing described above. At this time, a duty ratio of a signal output by the second switch transistor Q2 to the rectifying and filtering circuitry 40 begins to increase from zero at time T as shown in FIG. 5, and a supply voltage output by the output voltage terminal VOUT described above begins to be established. In this case, a signal output by the output voltage terminal VOUT gradually increases after rectifying and filtering by the rectifying and filtering inductor Lf and the rectifying and filtering capacitor Cf of the rectifying and filtering circuitry 40, and at the end of the second phase P2, the voltage output by the output voltage terminal VOUT rises to the supply voltage, to achieve the objective of soft start. Thus, the second phase P2 described above is a soft-start phase.

It should be noted that, for the soft-start circuitry 10, when the resistance value of the second resistor R2 is increased, a rate at which the second capacitor C2 discharges through the second resistor R2 along an arrow direction shown in FIG. 6 decreases, thereby extending a duration in which the potential of the feedback voltage terminal FB is pulled down to the potential of the ground terminal GND, such that a rate at which the duty ratio of the signal output by the second switch transistor Q2 to the rectifying and filtering circuitry 40 begins to increase from zero decreases, so as to reduce a slope k of the signal output by the output voltage terminal VOUT (as shown in FIG. 2), thereby further improving effects of soft start and making a startup waveform more smooth.

In summary, the voltage of the output terminal of the operational amplifier U2 can control the duty ratio of the signal output by the second switch transistor Q2, so as to control the duration of the first phase P1 and control a slope of the signal output by the output voltage terminal VOUT is in a climbing phase during the second phase P2. The output terminal of the above operational amplifier U2 is generally packaged within a driving chip, which is difficult to lead out independently. However, the present disclosure can achieve the above objectives by controlling the potential of the feedback voltage terminal FB coupled to the second input terminal of the operational amplifier U2.

Furthermore, in order that the rectifying and filtering circuitry 40 can rectify and filter the signal output by the second switch transistor Q2 forming the driving circuitry 30, the rectifying and filtering circuitry 40 may include a rectifying and filtering inductor Lf and a rectifying and filtering capacitor Cf, as shown in FIG. 7.

Here, an end of the rectifying and filtering inductor Lf is coupled to the driving circuitry 30, and the other end is coupled to the output voltage terminal VOUT. When the driving circuitry 30 has a structure as described above, an end of the rectifying and filtering inductor Lf is coupled to the second electrode of the second switch transistor Q2. Furthermore, an end of the rectifying and filtering capacitor Cf is coupled to the output voltage terminal VOUT, and the other end is coupled to the ground terminal GND.

Finally, when the output voltage terminal VOUT gradually rises to the supply voltage, the second phase P2 described above ends, and the soft-start power supply circuit goes into the third phase P3, as shown in FIG. 2.

In the third phase P3, the following steps are performed.

When the voltage of the output voltage terminal VOUT rises to the supply voltage, the voltage of the output voltage terminal VOUT is sampled by the first sampling resistor and the second sampling resistor of the sampling circuitry 50, which is then output to the feedback voltage terminal FB.

At this time, since the voltage of the anode of the diode has been pulled down to the ground terminal GND during the above second phase P2, a voltage supplied by the sampling circuitry 50 to the feedback voltage terminal FB is greater than the voltage of the anode of the diode D of the soft-start circuitry 10, such that the diode D is in a reverse bias state. Since the diode D is in the reverse bias state, the potential of the feedback voltage terminal FB is isolated, such that the soft-start circuitry 10 will have no effect on the potential of the feedback voltage terminal FB. At this time, the soft-start circuitry 10 exits the operating state, and the voltage stored in the first capacitor C1 of the soft-start circuitry 10 gradually discharges to 0 V.

In this case, to ensure that the supply voltage output by the output voltage terminal VOUT during the third phase P3 is constant, the sampling circuitry 50 may sample the voltage output by the output voltage terminal VOUT in real time, and output it to the feedback voltage terminal FB, and then the above feedback operation circuitry 20 controls the driving circuitry 30 to adjust the supply voltage output by the signal output terminal VOUT, according to the voltage of the feedback voltage terminal FB.

Specifically, when the above voltage of the output voltage terminal VOUT, sampled by the sampling circuitry 50, is less than the supply voltage, the comparator U1 receives a high-level output from the output terminal of the operational amplifier U2, compares the high level with a signal output by the triangular wave signal terminal, and outputs a square signal. When the square signal controls the second switch transistor Q2 to be in the on state, signals of the input voltage terminal VIN are output by the second switch transistor Q2 to the rectifying and filtering circuitry 40 in sequence, and are output to the output voltage terminal VOUT after rectifying and filtering by the rectifying and filtering 40, so as to compensate for the voltage output by the output voltage terminal VOUT to ensure that a constant supply voltage can be output.

In summary, when the soft-start power supply circuit enters the third phase P3, the supply voltage is output by the output voltage terminal VOUT. In this case, the sampling circuitry 50 may sample the signal of the output voltage terminal VOUT, and output it to the feedback operation circuitry 20 through the feedback voltage terminal FB. Further, adjustment of the signal output by the output voltage terminal VOUT can be finally realized by controlling, by the feedback operation circuitry 20, the output signal of the driving circuitry 30, to ensure that the supply voltage output by the output voltage terminal VOUT is in a steady state. Thus, the above third phase P3 is a supply voltage output phase.

The above is merely the specific embodiments of the present disclosure; however, the scope of the present disclosure is not limited to this. For a person skilled in the art, changes or substitutions may be conceivable readily within the technical scope disclosed by the present disclosure, which shall fall within the scope of the present disclosure. Thus, the scope of the present disclosure should be subject to the scope of the claims.

What is claimed is:

1. A soft-start power supply circuit, comprising a feedback operation circuitry, a soft-start circuitry, a driving circuitry and a rectifying and filtering circuitry; wherein,
    the soft-start circuitry is coupled to an input voltage terminal, a ground terminal and a feedback voltage terminal, and is configured to pull up a potential of the feedback voltage terminal to a potential of the input voltage terminal during a first phase of an operating cycle and to pull down the potential of the feedback voltage terminal to a potential of the ground terminal during a second phase of the operating cycle;
    the feedback operation circuitry is coupled to the ground terminal, the feedback voltage terminal and the driving circuitry, and is configured to control the driving circuitry to be turned off during the first phase such that no signal is output by an output voltage terminal, and to control the driving circuitry to be turned on and off alternately during the second phase;
    the driving circuitry is coupled to the input voltage terminal and the rectifying and filtering circuitry, and is configured to output a signal of the input voltage terminal to the rectifying and filtering circuitry, in an on state; and
    the rectifying and filtering circuitry is coupled to the output voltage terminal, and is configured to rectify and filter the signal input into the rectifying and filtering circuitry, and output the rectified and filtered signal to the output voltage terminal, so as to enable a voltage output by the output voltage terminal during the second phase to increase gradually to a supply voltage,
    wherein:
    the soft-start circuitry comprises a first switch transistor, a first resistor, a second resistor, a first capacitor, a second capacitor and a diode;
    a first electrode of the first switch transistor is coupled to the input voltage terminal, a gate electrode of the first switch transistor is coupled to an end of the first resistor, and a second electrode of the first switch transistor is coupled to an anode of the diode;
    the other end of the first resistor is coupled to the input voltage terminal;
    an end of the second resistor is coupled to the anode of the diode, and the other end of the second resistor is coupled to the ground terminal;
    a cathode of the diode is coupled to the feedback voltage terminal;
    an end of the first capacitor is coupled to the gate electrode of the first switch transistor, and the other end of the first capacitor is coupled to the ground terminal; and
    an end of the second capacitor is coupled to the anode of the diode, and the other end of the second capacitor is coupled to the ground terminal.

2. The soft-start power supply circuit according to claim 1, further comprising a sampling circuitry, wherein,
    the sampling circuitry is coupled to the output voltage terminal, the ground terminal and the feedback voltage terminal, and is configured to sample the supply voltage output by the output voltage terminal during a third phase of the operating cycle, and to output the sampled supply voltage to the feedback voltage terminal, such that the feedback operation circuitry is configured to control the driving circuitry to adjust the supply voltage output by the output voltage terminal according to a voltage of the feedback voltage terminal.

3. The soft-start power supply circuit according to claim 1, wherein a resistance value of the first resistor is proportional to a duration of the first phase.

4. The soft-start power supply circuit according to claim 1, wherein a resistance value of the second resistor is inversely proportional to a rate at which the voltage output by the output voltage terminal during the second phase gradually increases to the supply voltage.

5. The soft-start power supply circuit according to claim 1, wherein the first switch transistor is a P-type transistor; and during the first phase, the first switch transistor is in the on state, and during the second phase, the first switch transistor is in an off state.

6. The soft-start power supply circuit according to claim 1, wherein:

the feedback operation circuitry comprises an operational amplifier, a comparator, an operational-amplifier resistor and an operational-amplifier capacitor;

a first input terminal of the operational amplifier is coupled to a reference voltage terminal, a second input terminal of the operational amplifier is coupled to the feedback voltage terminal, and an output terminal of the operational amplifier is coupled to a second input terminal of the comparator;

a first input terminal of the comparator is coupled to a triangular wave signal terminal, and an output terminal of the comparator is coupled to the driving circuitry;

an end of the operational-amplifier resistor is coupled to the feedback voltage terminal, and the other end of the operational-amplifier resistor is coupled to the operational-amplifier capacitor; and the other end of the operational-amplifier capacitor is coupled to the output terminal of the operational amplifier.

7. The soft-start power supply circuit according to claim 1, wherein:

the driving circuitry comprises a second switch transistor; and a gate electrode of the second switch transistor is coupled to the feedback operation circuitry, and a first electrode of the second switch transistor is coupled to the input voltage terminal, and a second electrode of the second switch transistor is coupled to the rectifying and filtering circuitry.

8. The soft-start power supply circuit according to claim 1, wherein:

the rectifying and filtering circuitry comprises a rectifying and filtering inductor and a rectifying and filtering capacitor;

an end of the rectifying and filtering inductor is coupled to the driving circuitry, and the other end of the rectifying and filtering inductor is coupled to the output voltage terminal; and an end of the rectifying and filtering capacitor is coupled to the output voltage terminal, and the other end of the rectifying and filtering capacitor is coupled to the ground terminal.

9. A display device, comprising the soft-start power supply circuit according to claim 1.

10. The soft-start power supply circuit according to claim 1, wherein feedback operation circuitry is further configured to output, during the second phase of the operating cycle, a square signal with a duty ratio gradually decreasing to the driving circuitry.

11. The soft-start power supply circuit according to claim 2, wherein:

the sampling circuitry comprises a first sampling resistor and a second sampling resistor;

an end of the first sampling resistor is coupled to the output voltage terminal, and the other end of the first sampling resistor is coupled to the feedback voltage terminal; and an end of the second sampling resistor is coupled to the feedback voltage terminal, and the other end of the second sampling resistor is coupled to the ground terminal.

12. The soft-start power supply circuit according to claim 7, wherein the second switch transistor is a P-type transistor; and during the first phase, the second switch transistor is in the on state, and during the second phase, the second switch transistor is turned on and off alternately.

13. The soft-start power supply circuit according to claim 10, wherein:

the soft-start circuitry comprises a first switch transistor, a first resistor, a second resistor, a first capacitor, a second capacitor and a diode;

a first electrode of the first switch transistor is coupled to the input voltage terminal, a gate electrode of the first switch transistor is coupled to an end of the first resistor, and a second electrode of the first switch transistor is coupled to an anode of the diode;

the other end of the first resistor is coupled to the input voltage terminal;

an end of the second resistor is coupled to the anode of the diode, and the other end of the second resistor is coupled to the ground terminal;

a cathode of the diode is coupled to the feedback voltage terminal;

an end of the first capacitor is coupled to the gate electrode of the first switch transistor, and the other end of the first capacitor is coupled to the ground terminal; and an end of the second capacitor is coupled to the anode of the diode, and the other end of the second capacitor is coupled to the ground terminal.

14. A method for controlling a soft-start power supply circuit, the soft-start power supply circuit comprising a feedback operation circuitry, a soft-start circuitry, a driving circuitry and a rectifying and filtering circuitry, an operating cycle comprising a first phase and a second phase, and the method comprising:

during the first phase, pulling up, by the soft-start circuitry, a potential of a feedback voltage terminal to a potential of an input voltage terminal, and controlling, by the feedback operation circuitry, the driving circuitry to be turned off according to the potential of the feedback voltage terminal, such that no signal is output by an output voltage terminal; and during the second phase, pulling down, by the soft-start circuitry, the potential of the feedback voltage terminal to a potential of a ground terminal, controlling, by the feedback operation circuitry, the driving circuitry to be turned on and off alternately according to the potential of the feedback voltage terminal, outputting, by the driving circuitry in an on state, a signal of the input voltage terminal to the rectifying and filtering circuitry, rectifying and filtering, by the rectifying and filtering circuitry, the signal input into the rectifying and filtering circuitry, and outputting, by the rectifying and filtering circuitry, the rectified and filtered signal to the output voltage circuitry, so as to enable a voltage output by the output voltage terminal during the second phase to increase gradually to a supply voltage;

wherein, the soft-start circuitry is coupled to the input voltage terminal, the ground terminal and the feedback voltage terminal, the feedback operation circuitry is coupled to the ground terminal, the feedback voltage terminal and the driving circuitry, the driving circuitry is coupled to the input voltage terminal and the rectifying and filtering circuitry, and the rectifying and filtering circuitry is coupled to the output voltage terminal, wherein the soft-start circuitry comprises a first switch transistor, a first resistor, a second resistor, a first capacitor, a second capacitor and a diode, the feedback operation circuitry comprises an operational amplifier, a comparator, an operational-amplifier resistor and an operational-amplifier capacitor, the driving circuitry comprises a second switch transistor; the rectifying and filtering circuitry comprises a rectifying and filtering inductor and a rectifying and filtering capacitor, and the first switch transistor and the second switch transistor are P-type transistors; and during the first phase, the following steps are performed:

turning the first switch transistor on, charging the first capacitor through the first resistor by a high-level output of the input voltage terminal, and charging, by the first capacitor, a gate electrode of the first switch transistor; wherein, the first switch transistor remains in an on state in the case of $U_{IN}-U_A \geq U_{Q1th}$, and $U_{IN}$ is a voltage output by the input voltage terminal, $U_A$ is a gate voltage of the first switch transistor, and $U_{Q1th}$ is a threshold voltage of the first switch transistor;

outputting the high-level output of the input voltage terminal to an anode of the diode through the first switch transistor that is in the on state, and charging the second capacitor;

in the case that a voltage of the anode of the diode is greater than a voltage of a cathode, causing the diode to be in an on state, and pulling up the potential of the feedback voltage terminal to the potential of the input voltage terminal; and supplying, by an output terminal of the operational amplifier, a low-level output, and receiving, by the comparator, the low-level output from the output terminal of the operational amplifier, and supplying, by the comparator, a high-level output and turning the second switch transistor off.

15. The method for controlling the soft-start power supply circuit according to claim 14, wherein the soft-start power supply circuit further comprises a sampling circuitry, the operating cycle further comprises a third phase, and the method further comprises:

during the third phase, sampling the supply voltage output by the output voltage terminal, and outputting the sampled supply voltage to the feedback voltage terminal, such that the feedback operation circuitry is configured to control the driving circuitry to adjust the supply voltage output by the voltage output terminal according to a voltage of the feedback voltage terminal, wherein the sampling circuitry is coupled to the output voltage terminal, the ground terminal and the feedback voltage terminal.

16. The method for controlling the soft-start power supply circuit according to claim 14, wherein the soft-start circuitry comprises a first switch transistor, a first resistor, a second resistor, a first capacitor, a second capacitor and a diode, the feedback operation circuitry comprises an operational amplifier, a comparator, an operational-amplifier resistor and an operational-amplifier capacitor, the driving circuitry comprises a second switch transistor, the rectifying and filtering circuitry comprises a rectifying and filtering inductor and a rectifying and filtering capacitor, and the first switch transistor and the second switch transistor are P-type transistors; and during the second phase, the following steps are performed:

turning the first switch transistor off in the case of $U_{IN}-U_A<U_{Q1th}$, discharging the second capacitor, and gradually pulling down the potential of the feedback voltage terminal to the potential of the ground terminal through the diode, wherein $U_{IN}$ is a voltage output by the input voltage terminal, $U_A$ is a gate voltage of the first switch transistor, and $U_{Q1th}$ is a threshold voltage of the first switch transistor;

supplying, by an output terminal of the operational amplifier, an output with a high level gradually increasing, receiving, by the comparator, the high-level output from the output terminal of the operational amplifier, outputting a square signal with a duty ratio gradually decreasing, and turning the second switch transistor on and off alternately under the control of the square signal; and outputting, by the second switch transistor in an on state, the signal of the input voltage terminal to the rectifying and filtering inductor and the rectifying and filtering capacitor for rectifying and filtering, and then outputting the rectified and filtered signal to the output voltage terminal.

17. The method for controlling the soft-start power supply circuit according to claim 14, wherein a resistance value of the first resistor is proportional to a duration of the first phase.

18. The method for controlling the soft-start power supply circuit according to claim 14, wherein a resistance value of the second resistor is inversely proportional to a rate at which the voltage output by the output voltage terminal during the second phase gradually increases to the supply voltage.

19. The method for controlling the soft-start power supply circuit according to claim 15, wherein the soft-start circuitry comprises a first switch transistor, a first resistor, a second resistor, a first capacitor, a second capacitor and a diode; the feedback operation circuitry comprises an operational amplifier, a comparator, an operational-amplifier resistor and an operational-amplifier capacitor, the driving circuitry comprises a second switch transistor, the rectifying and filtering circuitry comprises a rectifying and filtering inductor and a rectifying and filtering capacitor, the sampling circuitry comprises a first sampling resistor and a second sampling resistor, and the first switch transistor and the second switch transistor are P-type transistors; and during the third phase, the following steps are performed:

in the case that the voltage of the output voltage terminal rises to the supply voltage, sampling, by the first sampling resistor and the second sampling resistor, the voltage of the output voltage terminal, and outputting the sampled voltage to the feedback voltage terminal;

in the case that a voltage of a cathode of the diode coupled to the feedback voltage terminal is greater than a voltage of an anode of the diode, causing the diode to be in a reverse bias state; and receiving, by the operational amplifier, the voltage of the feedback voltage terminal; in the case that the voltage of the feedback voltage terminal is less than the supply voltage, receiving, by the comparator, a high-level output from an output terminal of the operational amplifier, and outputting a square signal; and in the case that the square signal is configured to control the second switch transistor to be in an on state, outputting, by the second switch transistor, the signal of the input voltage terminal to the rectifying and filtering inductor and the rectifying and filtering capacitor for rectifying and filtering, and then outputting the rectified and filtered signal to the output voltage terminal.

20. A soft-start power supply circuit, comprising a feedback operation circuitry, a soft-start circuitry, a driving circuitry and a rectifying and filtering circuitry; wherein, the soft-start circuitry is coupled to an input voltage terminal, a ground terminal and a feedback voltage terminal, and is configured to pull up a potential of the feedback voltage terminal to a potential of the input voltage terminal during a first phase of an operating cycle and to pull down the potential of the feedback voltage terminal to a potential of the ground terminal during a second phase of the operating cycle;

the feedback operation circuitry is coupled to the ground terminal, the feedback voltage terminal and the driving circuitry, and is configured to control the driving circuitry to be turned off during the first phase such that no signal is output by an output voltage terminal, and to control the driving circuitry to be turned on and off alternately during the second phase;

the driving circuitry is coupled to the input voltage terminal and the rectifying and filtering circuitry, and is configured to output a signal of the input voltage terminal to the rectifying and filtering circuitry, in an on state; and the rectifying and filtering circuitry is coupled to the output voltage terminal, and is configured to rectify and filter the signal input into the rectifying and filtering circuitry, and output the rectified and filtered signal to the output voltage terminal, so as to enable a voltage output by the output voltage terminal during the second phase to increase gradually to a supply voltage, wherein the rectifying and filtering circuitry comprises a rectifying and filtering inductor and a rectifying and filtering capacitor; an end of the rectifying and filtering inductor is coupled to the driving circuitry, and the other end of the rectifying and filtering inductor is coupled to the output voltage terminal; and an end of the rectifying and filtering capacitor is coupled to the output voltage terminal, and the other end of the rectifying and filtering capacitor is coupled to the ground terminal.

* * * * *